(12) United States Patent
Cole et al.

(10) Patent No.: US 11,613,018 B2
(45) Date of Patent: Mar. 28, 2023

(54) ROBOTIC MANIPULATION INTELLIGENCE SYSTEMS AND METHODS FOR AUTOMATIC RESTOCKING OF ITEMS IN RETAIL STORE ENVIRONMENTS

(71) Applicant: ABB Schweiz AG, Baden (CH)

(72) Inventors: Gregory A. Cole, West Hartford, CT (US); Gregory F. Rossano, Enfield, CT (US); Jordi Artigas, Baden (CH); Harald Staab, Neckargemuend (DE); Thomas A. Fuhlbrigge, Ellington, CT (US); Carlos Martinez, South Windsor, CT (US); Sangeun Choi, Simsbury, CT (US); Jianjun Wang, West Hartford, CT (US); Xiongzi Li, West Hartford, CT (US)

(73) Assignee: ABB Schweiz AG, Baden (CH)

( * ) Notice: Subject to any disclaimer, the term of this patent is extended or adjusted under 35 U.S.C. 154(b) by 934 days.

(21) Appl. No.: 16/297,030

(22) Filed: Mar. 8, 2019

(65) Prior Publication Data

US 2020/0282560 A1 Sep. 10, 2020

(51) Int. Cl.
*G06Q 20/20* (2012.01)
*B25J 9/16* (2006.01)
(Continued)

(52) U.S. Cl.
CPC .......... *B25J 9/1669* (2013.01); *B25J 9/1664* (2013.01); *B65G 47/90* (2013.01); *G06Q 10/087* (2013.01)

(58) Field of Classification Search
CPC ........ B25J 9/0084; B25J 5/007; B25J 9/1679; B25J 11/008; B25J 15/0019; B25J 9/1697;
(Continued)

(56) References Cited

U.S. PATENT DOCUMENTS 9,102,055 B1 8/2015 Konolige et al.
10,336,543 B1 * 7/2019 Sills .................... G05D 1/0027
(Continued)

FOREIGN PATENT DOCUMENTS

WO WO 2015/187975 A1 12/2015
WO WO 2016/100235 A1 6/2016
WO WO 2017/100346 A1 6/2017

OTHER PUBLICATIONS

European Patent Office, International Search Report in International Patent Application No. PCT/IB2020/051881, 5 pp. (dated May 14, 2020).
(Continued)

*Primary Examiner* — Dalena Tran
(74) *Attorney, Agent, or Firm* — Leydig, Voit & Mayer, Ltd.

(57) ABSTRACT

Systems and methods for automatic restocking different items in retail store environments having POS locations for the items are disclosed. The method includes, for a first item of the different items, storing at least one first item parameter uniquely identifying the first item. The method includes determining, based on the at least one first item parameter, a first autonomous movement control scheme for manipulation of the first item by a robotic arm. The method includes executing, by the robotic arm, the first control scheme, the executing including shelving the first item on the shelf. The method includes evaluating, by a processor or a user of the robotic arm, the executing for the first item according to at least one predetermined first performance criteria. The method includes determining and storing, based on the evaluating, an updated first control scheme for subsequent executing by the robotic arm for the first item.

18 Claims, 9 Drawing Sheets

(51) Int. Cl.
*B65G 47/90* (2006.01)
*G06Q 10/087* (2023.01)

(58) Field of Classification Search
CPC ....... B25J 13/089; B25J 5/02; G01N 33/0098; G06Q 10/087; G06Q 10/0833; G06Q 50/28; G06Q 20/203; G05D 2201/0216; G05D 1/0088
USPC ............... 700/253; 414/222.02, 222.04, 800; 705/26.5; 901/27, 30
See application file for complete search history.

(56) References Cited

U.S. PATENT DOCUMENTS

| | | | |
|---|---|---|---|
| 2016/0236867 A1* | 8/2016 | Brazeau | B25J 5/007 |
| 2017/0225336 A1* | 8/2017 | Deyle | B25J 5/007 |
| 2018/0005173 A1* | 1/2018 | Elazary | G06Q 30/0202 |
| 2018/0060764 A1 | 3/2018 | Hance et al. | |
| 2018/0157873 A1 | 6/2018 | Roth | |
| 2018/0284760 A1 | 10/2018 | Gupta et al. | |
| 2018/0370727 A1 | 12/2018 | Hance et al. | |
| 2020/0037522 A1* | 2/2020 | DeJarnette | B25J 9/0084 |

OTHER PUBLICATIONS

European Patent Office, Written Opinion in International Patent Application No. PCT/IB2020/051881, 8 pp. (dated May 14, 2020).

Robotics Enabling Fully-Integrated Logistics Lines for Supermarkets—REFILLS (Project ID: 731590), European Commission [retrieved on Sep. 20, 2018], Retrieved from the Internet: <URL: www.refills-project.eu>.

European Patent Office, International Search Report in International Patent Application No. PCT/IB2020/052870, 5 pp. (dated May 13, 2020).

European Patent Office, Written Opinion in International Patent Application No. PCT/IB2020/052870, 6 pp. (dated May 13, 2020).

* cited by examiner

ROBOTIC MANIPULATION INTELLIGENCE SYSTEMS AND METHODS FOR AUTOMATIC RESTOCKING OF ITEMS IN RETAIL STORE ENVIRONMENTS

TECHNICAL FIELD

The present disclosure relates to retail store robotic restocking of items, and, more particularly, to robotic manipulation intelligence systems and methods for automatic restocking of items in retail store environments.

BACKGROUND

In-store logistics involves management of the inventory flow from the store's receiving dock to the point-of-sale (POS), passing through the stock room. This includes unloading, placing POS labels, prices tickets/stickers, item put-away, and restocking of items. Stock clerks and order re-fillers do most of the in-store product handling tasks today manually. Typically shelving cartons on the store shelf is repetitive and physically demanding.

The ultimate goal for retail logistics is to have the right item in the right quantity, at the right time and place, in the right condition. At least some known systems and methods for robotic restocking are hampered by a wide variation of items, which need to be manipulated in different ways, as well as by the presence of obstacles present in store aisles, among other challenges. Robotic restocking needs to handle a wide variety of items, which need to be manipulated in different ways in order to restock robustly and meet required cycle times. Because of the large number of, and the wide variation in, different items to be restocked, there is a need for a very low cost, low effort way to teach manipulation intelligence.

SUMMARY

The robotic manipulation intelligence systems and methods for automatic restocking of items in retail store environments disclosed herein increase restocking efficiency, flexibility and productivity, and address the issues of health and safety associated with fully manual tasks.

In one aspect, the disclosure describes a method for automatic restocking a plurality of different items in a retail store environment. The retail store environment has point of sale (POS) locations for the plurality of different items. The POS locations include at least one shelf positioned adjacent to at least one aisle. The method includes, for a first item of the plurality of different items, storing in a database at least one first item parameter uniquely identifying the first item. For the first item, the method includes determining, by a processor in communication with the database and based on the at least one first item parameter, a first autonomous movement control scheme for manipulation of the first item by a robotic arm in communication with the processor. For the first item, the method includes executing, by the robotic arm, the first autonomous movement control scheme, where the executing includes shelving the first item on the at least one shelf. For the first item, the method includes evaluating, by at least one of: the processor, and a user of the robotic arm, the executing for the first item according to at least one predetermined first performance criteria stored in the database. For the first item, the method includes determining and storing in the database, by the processor and based on a result of the evaluating, an updated first autonomous movement control scheme for subsequent executing by the robotic arm for the first item.

In another aspect, the disclosure describes a system for automatic restocking a plurality of different items in a retail store environment. The retail store environment has POS locations for the plurality of different items. The POS locations include at least one shelf positioned adjacent to at least one aisle. The system includes at least one robotic arm and one or more processors in communication with the at least one robotic arm. The system includes one or more memory devices in communication with the one or more processors. The one or more memory devices include a database stored therein. The one or more processors are programmed to, for a first item of the plurality of different items, store at least one first item parameter uniquely identifying the first item in the database. The one or more processors are programmed to, for the first item, determine, based on the at least one first item parameter, a first autonomous movement control scheme for manipulation of the first item by the at least one robotic arm. The one or more processors are programmed to, for the first item, execute, by the at least one robotic arm, the first autonomous movement control scheme. For executing the first autonomous movement control scheme, the one or more processors are further programmed to shelve the first item on the at least one shelf. The one or more processors are programmed to, for the first item, evaluate the execution of the first autonomous movement control scheme for the first item according to at least one predetermined first performance criteria stored in the database. The one or more processors are programmed to, for the first item, determine and store in the database, based on a result of the evaluation of the execution of the first autonomous movement control scheme, an updated first autonomous movement control scheme for at least one subsequent execution by the at least one robotic arm for the first item.

In yet another aspect, the disclosure describes a non-transient computer-readable medium. The non-transient computer-readable medium stores as software processor-executable instructions for automatically restocking a plurality of different items in a retail store environment. The retail store environment has POS locations for the plurality of different items. The POS locations include at least one shelf positioned adjacent to at least one aisle. When executed by one or more processors in communication with a database, the processor-executable instructions cause the one or more processors to, for a first item of the plurality of different items, obtain and store at least one first item parameter uniquely identifying the first item in the database. When executed by one or more processors in communication with a database, the processor-executable instructions cause the one or more processors to, for the first item, determine, based on the at least one first item parameter, a first autonomous movement control scheme for manipulation of the first item by a robotic arm in communication with the one or more processors. When executed by one or more processors in communication with a database, the processor-executable instructions cause the one or more processors to, for the first item, execute, by the robotic arm, the first autonomous movement control scheme. For executing the first autonomous movement control scheme, the processor-executable instructions cause the one or more processors to shelve the first item on the at least one shelf. When executed by one or more processors in communication with a database, the processor-executable instructions cause the one or more processors to, for the first item, evaluate the execution of the first autonomous movement control scheme for the first item according to at least one predetermined first performance criteria stored in the database. When executed by one or more processors in communication with a database, the processor-executable instructions cause the one or more processors to, for the first item, determine and store in the database, based on a result of the evaluation of the execution of the first autonomous movement control scheme, an updated first autonomous movement control scheme for at least one subsequent execution by the robotic arm for the first item.

The robotic manipulation intelligence systems and methods for automatic restocking of items in retail store environments disclosed herein provide users a number of beneficial technical effects and realize various advantages as compared to known robotic restocking systems and methods. Such benefits include, without limitation, being more efficient in use of computing resources, network bandwidth, and memory storage capacity, providing less expensive and more user friendly installation, operation, and maintenance, consuming less power, being safer and less intrusive to users, shoppers, and employees in retail store and other use environments, allowing use with a number of different items, packaging configurations, delivery modalities, and POS configurations, being interoperable with various extant store equipment, and having the ability to utilize a number of data communication protocols.

Further and alternative aspects and features of the disclosed principles will be appreciated from the following detailed description and the accompanying drawings. As will be appreciated, the principles related to the disclosed robotic manipulation intelligence systems and methods for automatic restocking of items in retail store environments are capable of being carried out in other and different embodiments, and capable of being modified in various respects. Accordingly, it is to be understood that both the foregoing summary and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
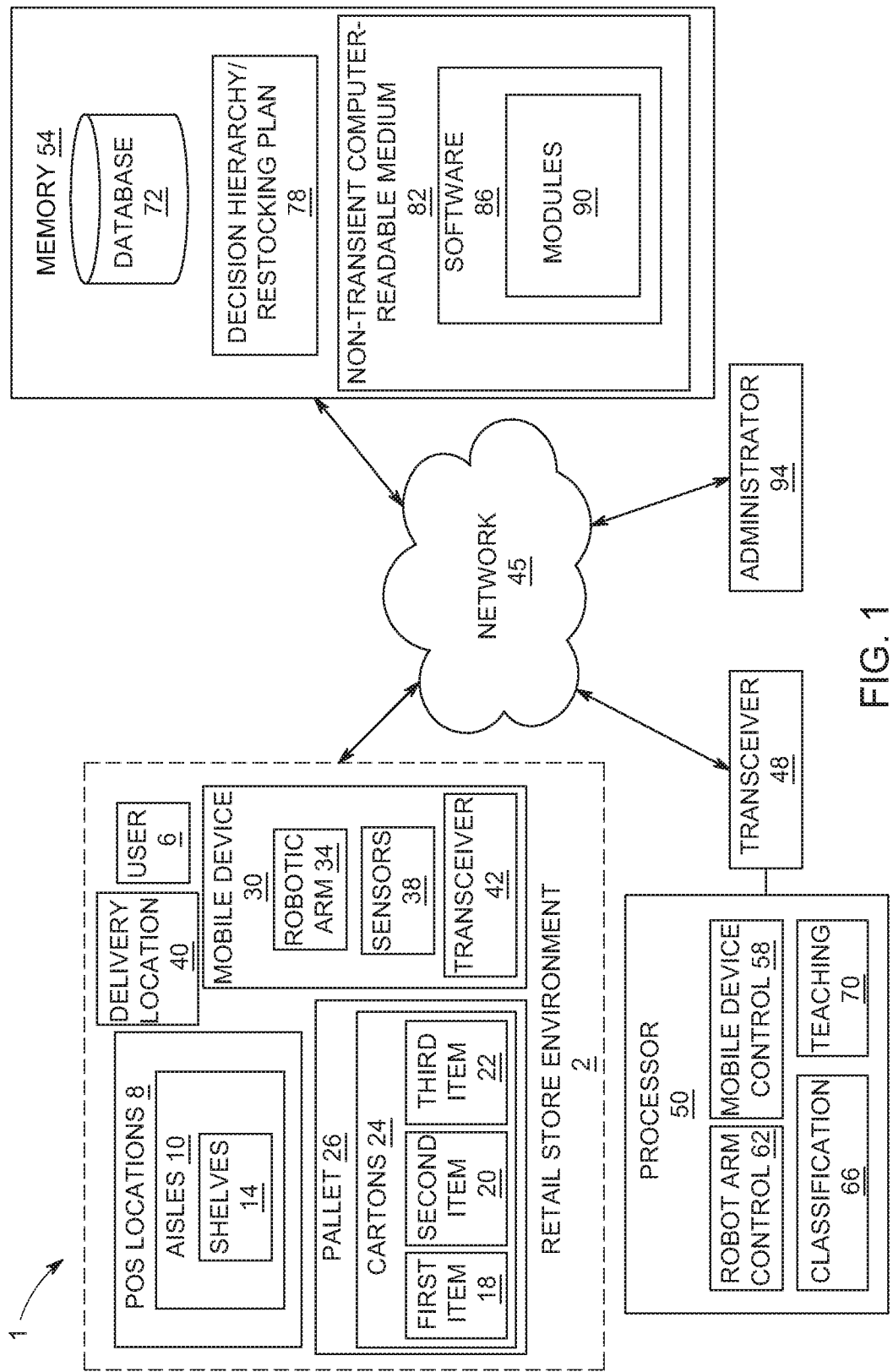
FIG. 1 is a schematic diagram of a system for automatic restocking of different items in a retail store environment according to an embodiment of the disclosure.
Figure 2:
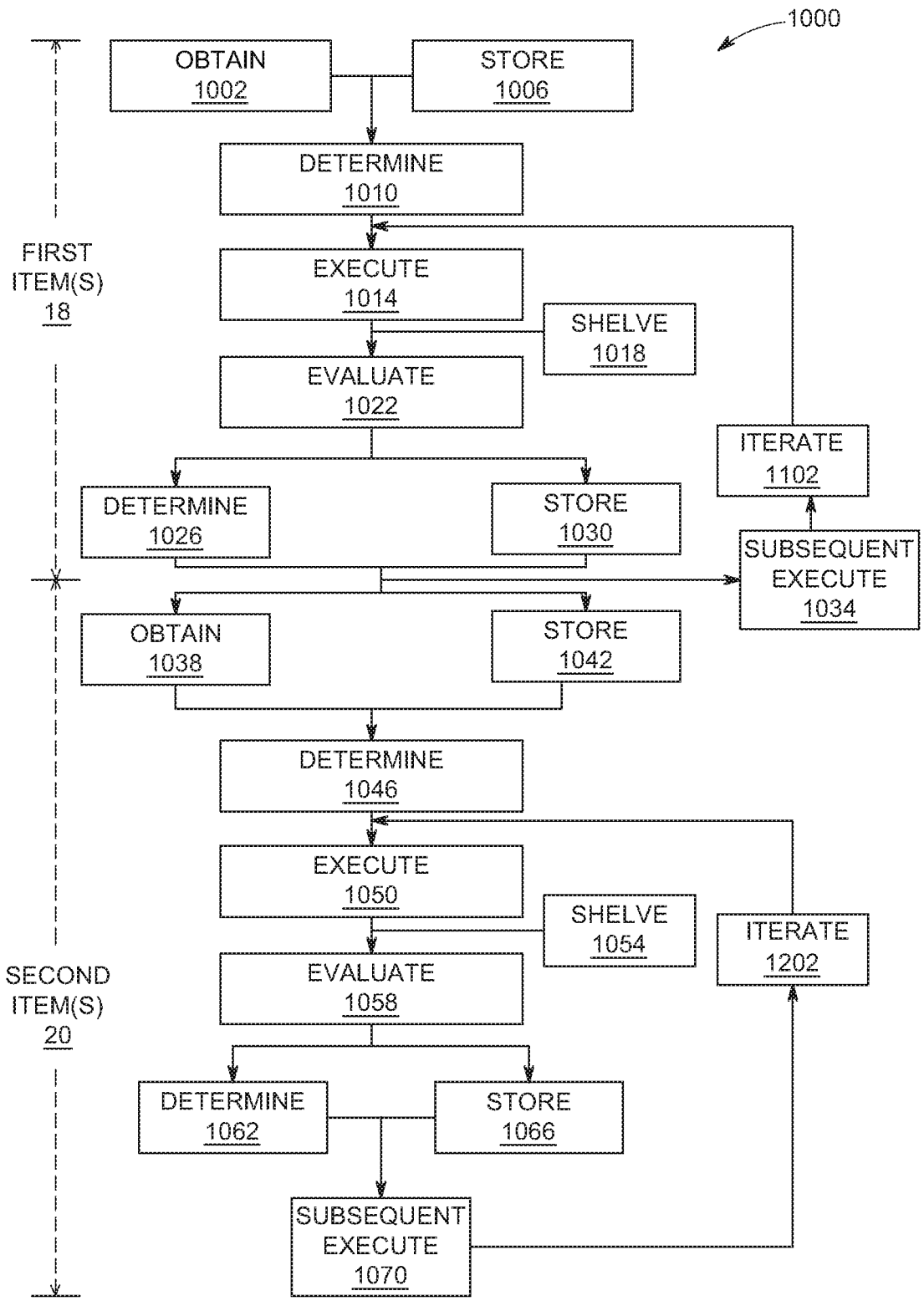
FIG. 2 is a flow chart of a method for automatic restocking of different items in the retail store environment shown in FIG. 1 according to an embodiment of the disclosure.
Figure 3:
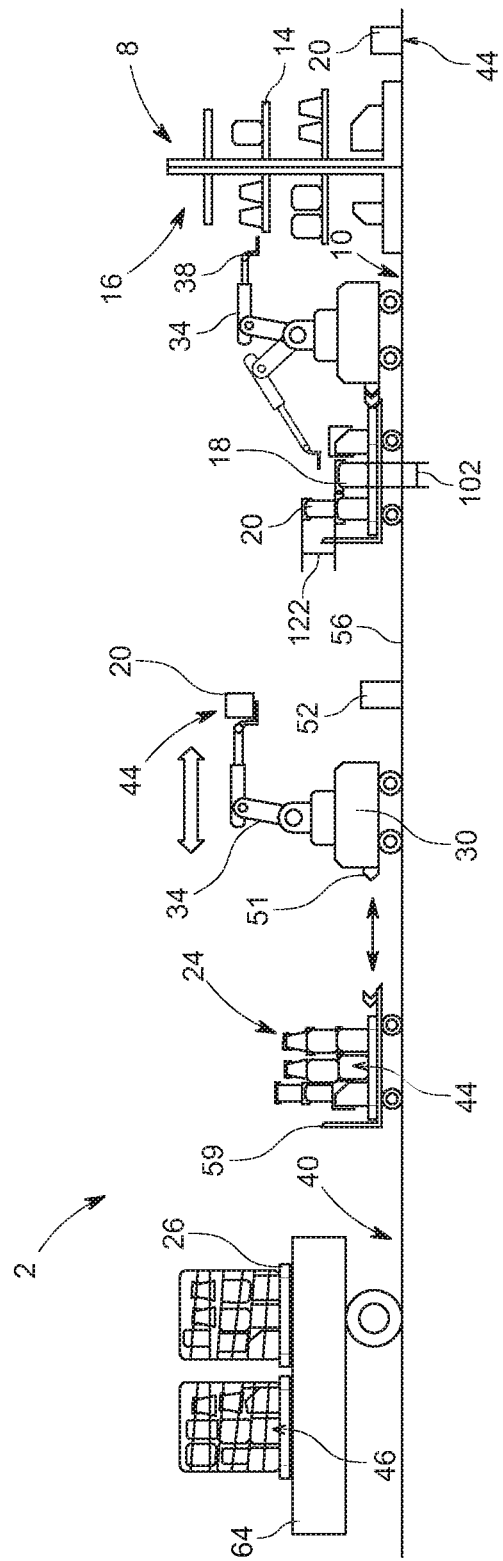
FIG. 3 and FIG. 4 are schematic diagrams of aspects of the system for automatic restocking of different items shown in FIG. 1 according to embodiments of the disclosure.
Figure 4:
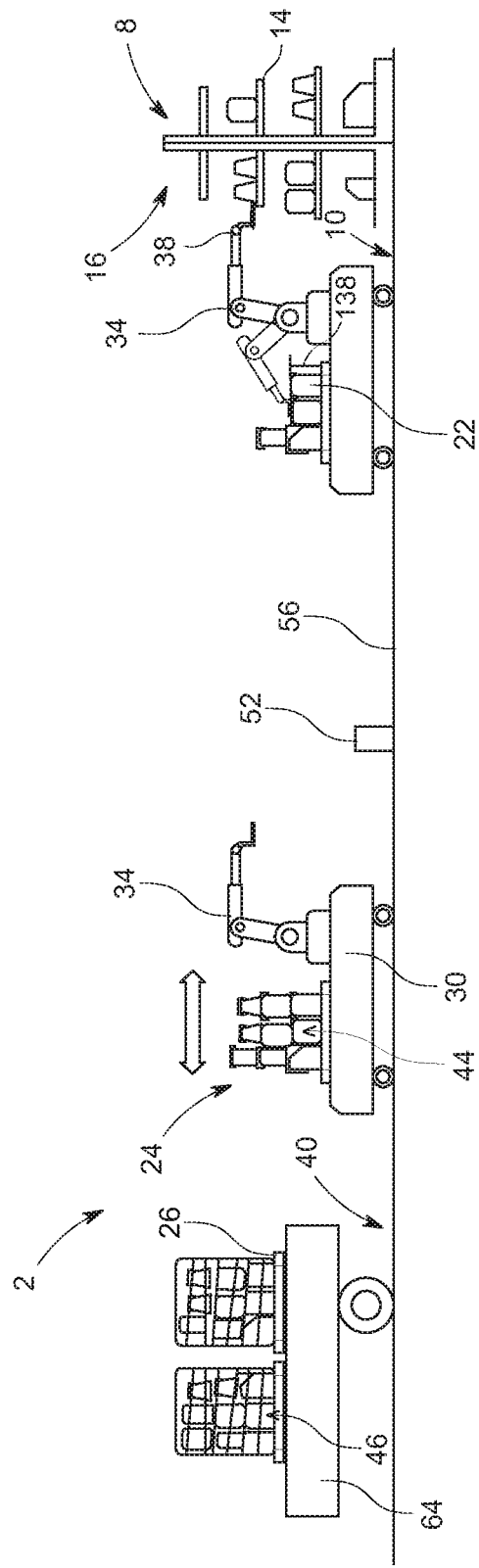

FIG. 1 is a schematic diagram of a system (1) for automatic restocking of a plurality of different items (18, 20, 22, ... (n−1)-th item, n-th item) in a retail store environment (2) according to an embodiment of the disclosure. FIG. 2 is a flow chart of a method (1000) for automatic restocking of the plurality of different items (18, 20) in the retail store environment (2) shown in FIG. 1 according to an embodiment of the disclosure. FIGS. 3 and 4 are schematic diagrams illustrating aspects of the system (1) for automatic restocking of different items (18, 20, 22) shown in FIG. 1 according to embodiments of the disclosure. In the examples illustrated in FIGS. 1, 3 and 4, the method shown in FIG. 2 is implemented, at least in part, using the system of FIGS. 1, 3 and 4.

Referring to FIGS. 1, 3 and 4, retail store environment (2) has point of sale (POS) locations (8) for the plurality of different items (18, 20, 22). The POS locations (8) include at least one shelf (14) positioned adjacent to at least one aisle (10). The plurality of different items (18, 20, 22) are positioned in retail store environment (2). Different items (18, 20, 22) may be contained in one or more cartons (24). Carton(s) (24) and/or items (18, 20, 22) are delivered to and/or otherwise arrive at retail store environment (2) at one or more delivery locations (40) (e.g., by a delivery vehicle (64) arriving at a loading dock delivery location (40) with items (18, 20, 22) in as-delivered positions (46)). Items (18, 20, 22) and/or carton(s) (24) may be positioned on one or more pallets (26) in retail store environment (2). Items (18, 20, 22) have at least one physical attribute (e.g., first physical attribute(s) for a first item (18) and second physical attribute(s) for a second item (20)), such as a shape, a weight, a height, a width, and/or a length.

Referring to FIGS. 1, 3 and 4, system (1) includes at least one robotic arm (34) and one or more processors (50) in communication with robotic arm(s) (34). Processor(s) (50) include a transceiver (48) in communication therewith. In an example, system (1) includes one or more mobile devices (30). In an example, mobile device(s) (30) include a hitch (51). In such embodiments, a trailer (59) is removably coupled to hitch (51), and mobile device(s) (30) tow trailer(s) (59) carrying one or more cartons (24), pallet(s) (26), and/or items (18, 20, 22). Robotic arm(s) (34) and/or mobile device(s) (30) include at least one sensor (38) positioned thereupon. Robotic arm(s) (34) and/or mobile device(s) (30) include one or more transceivers (42) positioned therein and/or thereupon. In an example, robotic arm(s) (34) is/are mounted and/or otherwise coupled to mobile device(s) (30). System (1) includes one or more memory devices (54) in communication with processor(s) (50). Memory device(s) (54) include a database (72) stored therein. In an example, memory device(s) (54) store a decision hierarchy/restocking plan (78). In an example, memory device(s) (54) are also in communication with robotic arm(s) (34) and/or mobile device(s) (30).

Processor(s) (50) may be located in retail environment (2). Processor(s) (50) may be located remote from retail environment (2). Processor(s) (50) may be collocated with robotic arm(s) (34) and/or mobile device(s) (30). Processor(s) (50) are programmed to implement and/or otherwise perform, at least in part, one or more of the disclosed steps of method (1000), including, without limitation, using system (1). Processor(s) (50) are capable of carrying out multiple functions in system (1). Processor(s) (50) include robotic arm control functionality (62). Processor(s) (50) include mobile device control functionality (58). Processor(s) (50) include classification functionality (66). Processor(s) (50) include teaching functionality (70). In an example, classification (66) and/or teaching (70) functionality of processor(s) (50) are implemented and/or otherwise performed, at least in part, in system (1) using an artificial intelligence and/or machine learning scheme(s).

In an example, memory device(s) (54) store a non-transient computer-readable medium (82). Non-transient computer-readable medium (82) stores as software (86) processor (50)-executable instructions for automatically restocking the plurality of different items (18, 20, 22) in retail store environment (2). In an example, processor (50)-executable instructions stored as software (86) includes one or more software modules (90). When executed by the processor(s) (50) that are in communication with memory device(s) (54), robotic arm(s) (34), and/or mobile device(s) (30), the processor (50)-executable instructions cause the one or more processors to implement and/or otherwise perform, at least in part, one or more of the disclosed steps of method (1000), including, without limitation, using system (1).

In system (1), processor(s) (50), memory device(s) (54), robotic arm(s) (34), and/or mobile device(s) (30) are in communication with one another via, and communicate with one another using signals (e.g., encoded data signals) sent and/or received through, a network (45). Communication among and between processor(s) (50), memory device(s) (54), robotic arm(s) (34), and/or mobile device(s) (30) is facilitated by transceivers (42, 48). In an example, system (1) communication using network (45) includes wireless communication equipment and protocols. In another example, system (1) communication using network (45) includes wired communication equipment and protocols. In yet another example, system (1) communication using network (45) includes a combination of wireless and wired communication equipment and protocols. In an example, system (1) communication includes wireless and/or wired communication equipment and protocols for utilizing cloud-based processing, storage, and/or communication resources. In an example, system (1) communication utilizes the Internet, including, without limitation, Internet of Things (IoT) protocols, practices, and/or standards.

Figure 5:
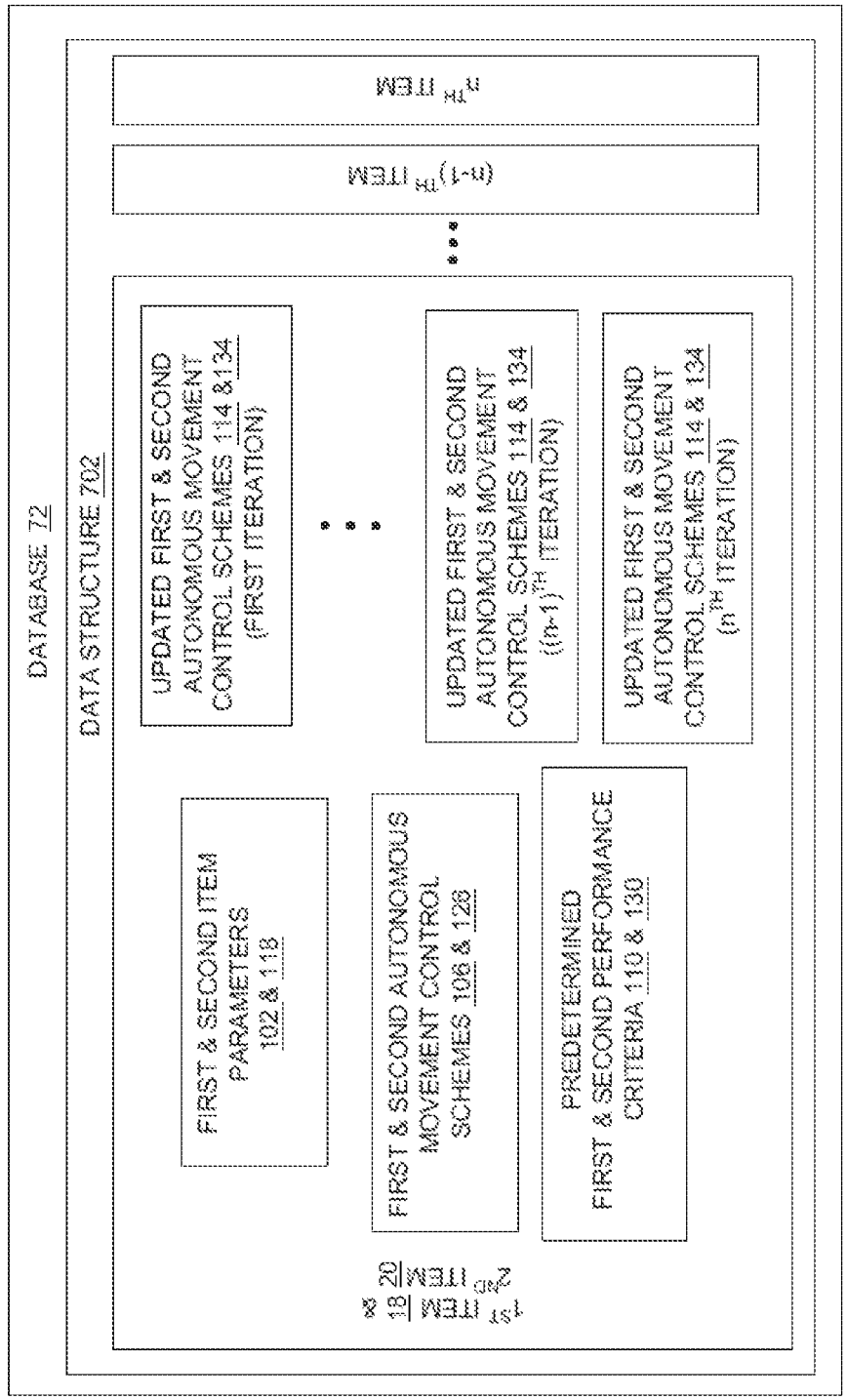
FIG. 5 is a block diagram of a data structure of the database shown in the system of FIG. 1 according to an embodiment of the disclosure.
Figure 6:
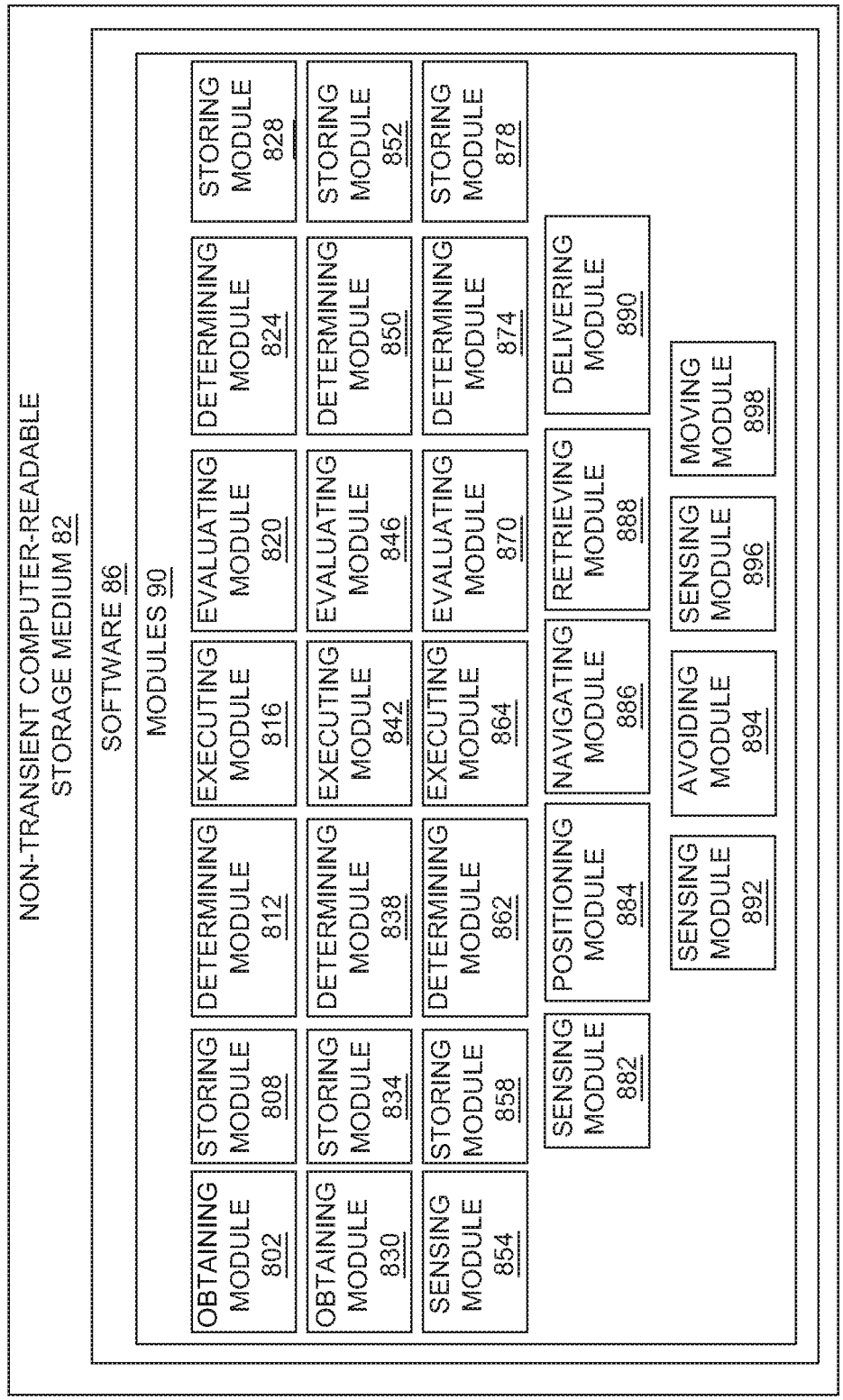
FIG. 6 is a block diagram of a software architecture for the method for automatic restocking of different items shown in FIG. 2 according to an embodiment of the disclosure.

FIG. 5 is a block diagram of a data structure (702) of the database (72) shown in the system (1) of FIG. 1 according to an embodiment of the disclosure. FIG. 6 is a block diagram of a software architecture for the method for automatic restocking of different items shown in FIG. 2 according to an embodiment of the disclosure. Referring to FIGS. 2, 5 and 6, method (1000) includes, for a first item (18) of the plurality of different items (18, 20, 22), obtaining (1002) and storing (1006) in a database (72) (and/or elsewhere in memory device(s) (54)) at least one first item parameter (102) uniquely identifying the first item (18). In another example, first item parameter(s) (102) are obtained by processor(s) (50) from an administrator (94) of system (1). In embodiments for which the obtaining (1002) step is implemented and/or otherwise performed by software (86), processor(s) (50) execute processor (50)-executable instructions stored in an obtaining module (802). In an example, first item parameter(s) (102) are stored by processor(s) (50) in data structure (702) and/or elsewhere in memory device(s) (54). In embodiments for which the storing (1006) step is implemented and/or otherwise performed by software (86), the processor(s) (50) execute processor (50)-executable instructions stored in a storing module (808). In an example, first item parameter(s) (102) uniquely identify physical attribute(s) of first item (18).

For the first item (18), method (1000) includes determining (1010), by processor(s) (50) in communication with database (72) and based on the at least one first item parameter (102), a first autonomous movement control scheme (106) for manipulation of first item (18) by robotic arm(s) (34) in communication with processor(s) (50). In an example, first autonomous movement control scheme (106) is determined by processor(s) (50) using robotic arm control functionality (62). In embodiments for which the determining (1010) step is implemented and/or otherwise performed by software (86), processor(s) (50) determine first autonomous movement control scheme (106) by executing processor (50)-executable instructions stored in a determining module (812). In an example, first autonomous movement control scheme (106) is stored by processor(s) (50) (e.g., using processor (50)-executable instructions stored in storing module (808)) in data structure (702) and/or elsewhere in memory device(s) (54).

For the first item (18), method (1000) includes executing (1014), by robotic arm(s) (34), the first autonomous movement control scheme (106). The executing (1014) step includes shelving (1018) the first item (18) on the at least one shelf (14). In an example, robotic arm control functionality (62) of processor(s) (50) facilitates executing the first autonomous movement control scheme (106) for the executing (1014) step. In embodiments for which the executing (1014) step is implemented and/or otherwise performed by software (86), processor(s) (50) execute first autonomous movement control scheme (106) by executing processor (50)-executable instructions stored in an executing module (816). In an example, first autonomous movement control scheme (106) is read by processor(s) (50) from data structure (702).

For the first item (18), method (1000) includes evaluating (1022), by processor(s) (50) and/or user (6) of robotic arm(s) (34), the evaluating (1022) step for the first item (18) according to at least one predetermined first performance criteria (110) stored in the database (72) and/or elsewhere in memory device(s) (54). In an example, robotic arm control (62), classification (66), and/or teaching (70) functionality of processor(s) (50) facilitates evaluating the evaluating (1022) step for the first item (18), including, without limitation, as a part of artificial intelligence and/or machine learning scheme(s). In an example, predetermined first performance criteria (110) is read by processor(s) (50) from data structure (702). In embodiments for which the evaluating (1022) step is implemented and/or otherwise performed by software (86), the processor(s) (50) execute processor (50)-executable instructions stored in an evaluating module (820).

For the first item (18), method (1000) includes determining (1026) and storing (1030) in the database (72) (and/or elsewhere in memory device(s) (54)), by the processor(s) (50) and based on a result of the evaluating (1022), an updated first autonomous movement control scheme (114) for subsequent executing (1034) by the robotic arm(s) (34) for the first item (18). In an example, robotic arm control (62), classification (66), and/or teaching (70) functionality of processor(s) (50) facilitates determining (1026) updated first autonomous movement control scheme (114), including, without limitation, as a part of artificial intelligence and/or machine learning scheme(s). In embodiments for which the determining (1026) step is implemented and/or otherwise performed by software (86), processor(s) (50) execute processor (50)-executable instructions stored in a determining module (824). In an example, updated first autonomous movement control scheme (114) is stored by processor(s) (50) in data structure (702) and/or elsewhere in memory device(s) (54). In embodiments for which the storing (1030) step is implemented and/or otherwise performed by software (86), the processor(s) (50) execute processor (50)-executable instructions stored in a storing module (828).

In an example, method (1000) includes iterating (1102), for at least one iteration including the subsequent executing (1034) step, the executing (1014) step for the first item(s) (18). In the example, the iterating (1102) step includes correcting a first and/or prior performance of the executing (1034) and/or shelving (1018) step(s) for the same and/or additional first item(s) (18). This correcting utilizes corrective and/or updated data acquired by processor(s) (50) and/or stored in memory device(s) (50) during a prior performance and/or prior iteration of any of the above-described obtaining (1002), storing (1006), determining (1010), executing (1014), shelving (1018), evaluating (1022), determining (1026), storing (1030), subsequent executing (1034), and iterating (1102) step(s) of method (1000). For example, and without limitation, in a first and/or prior performance of the evaluating (1022) step, a first item (18) was shelved (1018) on shelf (14) with a position on shelf (14) that deviated from a predetermined first performance criteria (110) related to shelving position. In an example, the next iteration of the executing (1034) and/or shelving (1018) step(s) applies at least one correction factor to facilitate additional first item(s) (18) being shelved on shelf (14) in respective position(s) (e.g., available position(s) (16)) satisfying the predetermined first performance criteria (110) related to shelving position. In another example, the next iteration(s) of the executing (1034) and/or shelving (1018) step(s) applies correction factor(s) to facilitate adjusting the position of the prior-positioned same shelved first item (18) such that the resultant position of first item (18) on shelf (14) approaches or fully complies with the predetermined first performance criteria (110) related to shelving position. For the iteration(s) (e.g., 1st, 2nd, . . . (n−1)-th, and n-th iteration(s)), processor(s) (50) read from memory device(s) (50) and utilize correction factor(s) and/or updated first autonomous movement control scheme(s) (114) for the subsequent executing (1034) by the robotic arm(s) (34) for the first item(s) (18). Mobile device control (58), classification (66), and/or teaching (70) functionality of processor(s) (50) facilitates one or more aspects of the iterating (1102) step described above, including, without limitation, as a part of artificial intelligence and/or machine learning scheme(s). In embodiments for which the iterating (1102) step is implemented and/or otherwise performed by software (86), processor(s) (50) execute processor (50)-executable instructions stored in one or more software (86) modules (90), including module(s) (90) in addition to those examples illustrated in FIG. 6.

In an embodiment, method (1000) includes, for a second item (20) of the plurality of different items (18, 20, 22), obtaining (1038) and storing (1042) in database (72) (and/or elsewhere in memory device(s) (54)) at least one second item parameter (122) uniquely identifying the second item (20) from at least the first item (18). In an example, second item parameter(s) (122) are obtained by processor(s) (50) from memory device(s) (54). In another example, second item parameter(s) (122) are obtained by processor(s) (50) from administrator (94). In embodiments for which the obtaining (1038) step is implemented and/or otherwise performed by software (86), processor(s) (50) execute processor (50)-executable instructions stored in an obtaining module (830). In an example, second item parameter(s) (122) are stored by processor(s) (50) in data structure (702) and/or elsewhere in memory device(s) (54). In embodiments for which the storing (1042) step is implemented and/or otherwise performed by software (86), the processor(s) (50) execute processor (50)-executable instructions stored in a storing module (834). In an example, second item parameter(s) (122) uniquely identify physical attribute(s) of second item (20).

For the second item (20), method (1000) includes determining (1046), by processor(s) (50) in communication with database (72) and based on the at least one second item parameter (122), a second autonomous movement control scheme (126) for manipulation of second item (20) by robotic arm(s) (34) in communication with processor(s) (50). In an example, second autonomous movement control scheme (126) is determined by processor(s) (50) using robotic arm control functionality (62). In embodiments for which the determining (1046) step is implemented and/or otherwise performed by software (86), processor(s) (50) determine second autonomous movement control scheme (126) by executing processor (50)-executable instructions stored in a determining module (838). In an example, second autonomous movement control scheme (126) is stored by processor(s) (50) (e.g., using processor (50)-executable instructions stored in storing module (834)) in data structure (702) and/or elsewhere in memory device(s) (54).

For the second item (20), method (1000) includes executing (1050), by robotic arm(s) (34), the second autonomous movement control scheme (126). The executing (1050) step includes shelving (1054) the second item (20) on the at least one shelf (14). In an example, robotic arm control functionality (62) of processor(s) (50) facilitates executing the second autonomous movement control scheme (126) for the executing (1050) step. In embodiments for which the executing (1050) step is implemented and/or otherwise performed by software (86), processor(s) (50) execute second autonomous movement control scheme (126) by executing processor (50)-executable instructions stored in an executing module (842). In an example, second autonomous movement control scheme (126) is read by processor(s) (50) from data structure (702).

For the second item (20), method (1000) includes evaluating (1058), by processor(s) (50) and/or user (6) of robotic arm(s) (34), the executing (1050) step for the second item (20) according to at least one predetermined second performance criteria (130) stored in the database (72) and/or elsewhere in memory device(s) (54). In an example, robotic arm control (62), classification (66), and/or teaching (70) functionality of processor(s) (50) facilitates evaluating the executing (1050) step for the second item (20), including, without limitation, as a part of artificial intelligence and/or machine learning scheme(s). In an example, predetermined second performance criteria (130) is read by processor(s) (50) from data structure (702). In embodiments for which the evaluating (1058) step is implemented and/or otherwise performed by software (86), the processor(s) (50) execute processor (50)-executable instructions stored in an evaluating module (846).

For the second item (20), method (1000) includes determining (1062) and storing (1066) in the database (72) (and/or elsewhere in memory device(s) (54)), by the processor(s) (50) and based on a result of the evaluating (1058), an updated second autonomous movement control scheme (134) for subsequent executing (1070) by the robotic arm(s) (34) for the second item (20). In an example, robotic arm control (62), classification (66), and/or teaching (70) functionality of processor(s) (50) facilitates determining (1062) updated second autonomous movement control scheme (134), including, without limitation, as a part of artificial intelligence and/or machine learning scheme(s). In embodiments for which the determining (1062) step is implemented and/or otherwise performed by software (86), processor(s) (50) execute processor (50)-executable instructions stored in a determining module (850). In an example, updated second autonomous movement control scheme (134) is stored by processor(s) (50) in data structure (702) and/or elsewhere in memory device(s) (54). In embodiments for which the storing (1066) step is implemented and/or otherwise performed by software (86), the processor(s) (50) execute processor (50)-executable instructions stored in a storing module (852).

In an example, method (1000) includes iterating (1202), for at least one iteration including the subsequent executing (1070) step, the executing (1050) step for the second item(s) (20). In the example, the iterating (1202) step includes correcting a first and/or prior performance of the executing (1070) and/or shelving (1054) step(s) for the same and/or additional second item(s) (20). This correcting utilizes corrective and/or updated data acquired by processor(s) (50) and/or stored in memory device(s) (50) during a prior performance and/or prior iteration of any of the above-described obtaining (1038), storing (1042), determining (1046), executing (1050), shelving (1054), evaluating (1058), determining (1062), storing (1066), subsequent executing (1070), and iterating (1202) step(s) of method (1000). For example, and without limitation, in a first and/or prior performance of the evaluating (1058) step, a second item (20) was shelved (1054) on shelf (14) with a position on shelf (14) that deviated from a predetermined second performance criteria (130) related to shelving position. In an example, the next iteration of the executing (1050) and/or shelving (1054) step(s) applies at least one correction factor to facilitate additional second item(s) (20) being shelved on shelf (14) in respective position(s) (e.g., available position(s) (16)) satisfying the predetermined second performance criteria (130) related to shelving position. In another example, the next iteration(s) of the executing (1050) and/or shelving (1054) step(s) applies correction factor(s) to facilitate adjusting the position of the prior-positioned same shelved second item (20) such that the resultant position of second item (20) on shelf (14) approaches or fully complies with the predetermined second performance criteria (130) related to shelving position. For the iteration(s) (e.g., 1st, 2nd, . . . (n−1)-th, and n-th iteration(s)), processor(s) (50) utilize correction factor(s) and/or updated second autonomous movement control scheme(s) (134) for the subsequent executing (1070) by the robotic arm(s) (34) for the second item(s) (20). Mobile device control (58), classification (66), and/or teaching (70) functionality of processor(s) (50) facilitates one or more aspects of the iterating (1202) step described above, including, without limitation, as a part of artificial intelligence and/or machine learning scheme(s). In embodiments for which the iterating (1202) step is implemented and/or otherwise performed by software (86), processor(s) (50) execute processor (50)-executable instructions stored in one or more software (86) modules (90), including module(s) (90) in addition to those examples illustrated in FIG. 6.

Figure 7:
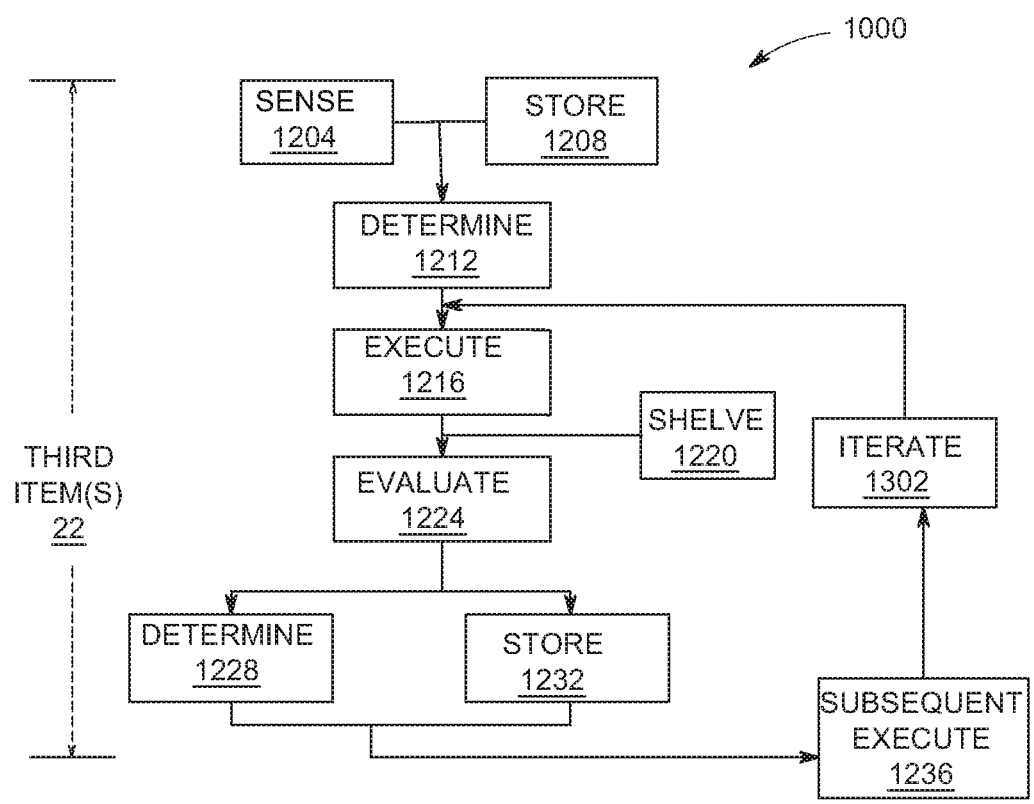
FIGS. 7-9 are flow charts of aspects of the method for automatic restocking of different items shown in FIG. 2 according to embodiments of the disclosure.
Figure 8:
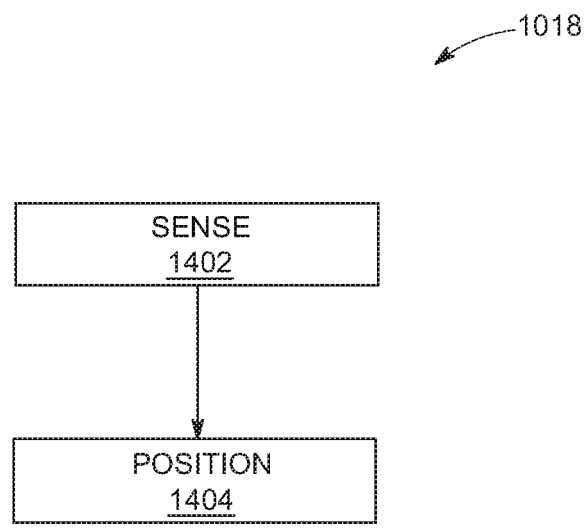
Figure 9:
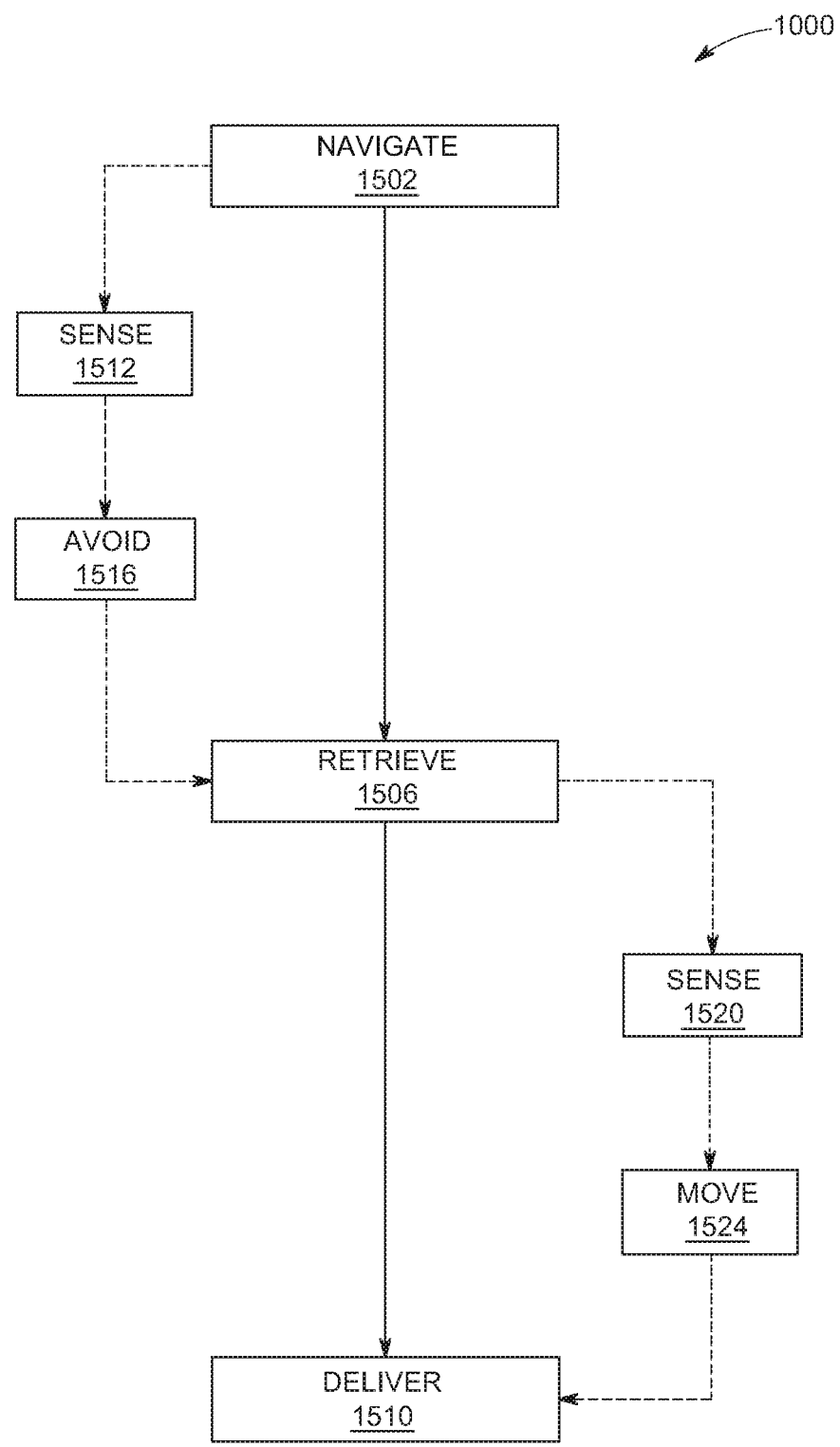

FIGS. 7-9 are flow charts of aspects of the method (1000) for automatic restocking of different items (18, 20, 22) shown in FIG. 2 according to embodiments of the disclosure. Referring to FIG. 7, in an embodiment, method (1000) includes for a third item (22) of the plurality of different items (18, 20, 22), sensing (1204), by at least one sensor (38) in communication with the processor (50), the at least one third item parameter (138). In an example, the sensing (1204) is implemented and/or otherwise performed, at least in part, in the absence of at least one third item parameter (138) uniquely identifying third item (22) from at least one of: the at least the first item (18), and at least the second item (20), being stored in the database (72) and/or elsewhere in memory device(s) (54). In an example, robotic arm control (62), classification (66), and/or teaching (70) functionality of processor(s) (50) facilitates sensing third item parameter(s) (138) for third item (22), including, without limitation, as a part of artificial intelligence and/or machine learning scheme(s). In an example, third item parameter(s) (138) are sensed by processor(s) (50) using sensor(s) (38) and third item parameter(s) (138) uniquely identify physical attribute(s) of third item (22) in similar fashion as discussed above with reference to first (18) and second (20) items. In embodiments for which the sensing (1204) step is implemented and/or otherwise performed by software (86), processor(s) (50) execute processor (50)-executable instructions stored in a sensing module (854).

For the third item (22), method (1000) includes storing (1208), by the processor(s) (50), third item parameter(s) in the database (72) and/or elsewhere in memory device(s) (54). In an example, third item parameter(s) are stored by processor(s) (50) in data structure (702) and/or elsewhere in memory devices (54). In embodiments for which the storing (1208) step is implemented and/or otherwise performed by software (86), the processor(s) (50) execute processor (50)-executable instructions stored in a storing module (858). In an example, sensed and stored third item parameter(s) uniquely identify physical attribute(s) of third item (22) such as a shape, a weight, a height, a width, and/or a length.

For the third item (22), method (1000) includes determining (1212), by processor(s) (50) in communication with database (72) and based on the at least one third item parameter (138), a third autonomous movement control scheme for manipulation of third item (22) by robotic arm(s) (34) in communication with processor(s) (50). In an example, third autonomous movement control scheme is determined by processor(s) (50) using robotic arm control functionality (62). In embodiments for which the determining (1212) step is implemented and/or otherwise performed by software (86), processor(s) (50) determine third autonomous movement control scheme by executing processor (50)-executable instructions stored in a determining module (862). In an example, third autonomous movement control scheme is stored by processor(s) (50) (e.g., using processor (50)-executable instructions stored in storing module (858)) in data structure (702) and/or elsewhere in memory device(s) (54).

For the third item (22), method (1000) includes executing (1216), by robotic arm(s) (34), the third autonomous movement control scheme. The executing (1216) step includes shelving (1220) the third item (22) on the at least one shelf (14). In an example, robotic arm control functionality (62) of processor(s) (50) facilitates executing the third autonomous movement control scheme for the executing (1216) step. In embodiments for which the executing (1216) step is implemented and/or otherwise performed by software (86), processor(s) (50) execute third autonomous movement control scheme by executing processor (50)-executable instructions stored in an executing module (864). In an example, third autonomous movement control scheme is read by processor(s) (50) from data structure (702).

For the third item (22), method (1000) includes evaluating (1224), by processor(s) (50) and/or user (6) of robotic arm(s) (34), the executing (1216) step for the third item (22) according to at least one predetermined third performance criteria stored in database (72) and/or elsewhere in memory device(s) (54). In an example, robotic arm control (62), classification (66), and/or teaching (70) functionality of processor(s) (50) facilitates evaluating the executing (1216) step for the third item (22), including, without limitation, as a part of artificial intelligence and/or machine learning scheme(s). In an example, predetermined third performance criteria is read by processor(s) (50) from data structure (702). In embodiments for which the evaluating (1224) step is implemented and/or otherwise performed by software (86), the processor(s) (50) execute processor (50)-executable instructions stored in an evaluating module (870).

For the third item (22), method (1000) includes determining (1228) and storing (1232) in the database (72) (and/or elsewhere in memory device(s) (54)), by the processor(s) (50) and based on a result of the evaluating (1224), an updated third autonomous movement control scheme for subsequent executing (1236) by the robotic arm(s) (34) for the third item (22). In an example, robotic arm control (62), classification (66), and/or teaching (70) functionality of processor(s) (50) facilitates determining (1228) updated third autonomous movement control scheme, including, without limitation, as a part of artificial intelligence and/or machine learning scheme(s). In embodiments for which the determining (1228) step is implemented and/or otherwise performed by software (86), processor(s) (50) execute processor (50)-executable instructions stored in a determining module (874). In an example, updated third autonomous movement control scheme is stored by processor(s) (50) in data structure (702) and/or elsewhere in memory device(s) (54). In embodiments for which the storing (1232) step is implemented and/or otherwise performed by software (86), the processor(s) (50) execute processor (50)-executable instructions stored in a storing module (878).

In an example, method (1000) includes iterating (1302), for at least one iteration including the subsequent executing (1236) step, the executing (1216) step for the third item(s) (22). In the example, the iterating (1302) step includes correcting a first and/or prior performance of the executing (1216) and/or shelving (1220) step(s) for the same and/or additional third item(s) (22). This correcting utilizes corrective and/or updated data acquired by processor(s) (50) and/or stored in memory device(s) (50) during a prior performance and/or prior iteration of any of the above-described sensing (1204), storing (1208), determining (1212), executing (1216), shelving (1220), evaluating (1224), determining (1228), storing (1232), subsequent executing (1236), and iterating (1302) step(s) of method (1000). For example, and without limitation, in a first and/or prior performance of the evaluating (1224) step, a third item (22) was shelved (1220) on shelf (14) with a position on shelf (14) that deviated from a predetermined third performance criteria related to shelving position. In an example, the next iteration of the executing (1216) and/or shelving (1220) step(s) applies at least one correction factor to facilitate additional third item(s) (22) being shelved on shelf (14) in respective position(s) (e.g., available position(s) (16)) satisfying the predetermined third performance criteria related to shelving position. In another example, the next iteration(s) of the executing (1216) and/or shelving (1220) step(s) applies correction factor(s) to facilitate adjusting the position of the prior-positioned same shelved third item (22) such that the resultant position of third item (22) on shelf (14) approaches or fully complies with the predetermined third performance criteria related to shelving position. For the iteration(s) (e.g., 1st, 2nd, . . . (n−1)-th, and n-th iteration(s)), processor(s) (50) utilize correction factor(s) and/or updated third autonomous movement control scheme(s) for the subsequent executing (1236) by the robotic arm(s) (34) for the third item(s) (22). Mobile device control (58), classification (66), and/or teaching (70) functionality of processor(s) (50) facilitates one or more aspects of the iterating (1302) step described above, including, without limitation, as a part of artificial intelligence and/or machine learning scheme(s). In embodiments for which the iterating (1302) step is implemented and/or otherwise performed by software (86), processor(s) (50) execute processor (50)-executable instructions stored in one or more software (86) modules (90), including module(s) (90) in addition to those examples illustrated in FIG. 6.

Referring to FIG. 8, in an embodiment, the shelving (1018, 1054, and/or 1220) step(s) of method (1000) includes sensing (1402), by sensor(s) (38) in communication with processor(s) (50), one or more available positions (16) on the at least one shelf (14). In an example, robotic arm control (62), classification (66), and/or teaching (70) functionality of processor(s) (50) facilitates sensing available position(s) (16) on the at least one shelf (14), including, without limitation, as a part of artificial intelligence and/or machine learning scheme(s). In an example, available position(s) (16) are sensed by processor(s) (50) using sensor(s) (38) and data representative of available position(s) (16) are stored by processor(s) (50) in the database (72) and/or elsewhere in memory device(s) (54). In embodiments for which the sensing (1402) step is implemented and/or otherwise performed by software (86), processor(s) (50) execute processor (50)-executable instructions stored in a sensing module (882).

The shelving (1018, 1054, and/or 1220) step(s) of method (1000) includes positioning (1404), by the robotic arm(s) (34), the first item (18) on the at least one shelf (14) based on the sensed one or more available positions (16). In an example, robotic arm control (62) functionality of processor(s) (50) facilitates positioning first item (18) on the at least one shelf (14). In an example, processor(s) (50) determine and store as-positioned shelf (14) locations of positioned first item(s) (18) in database (72) and/or elsewhere in memory device(s) (54). In embodiments for which the positioning step (1404) is implemented and/or otherwise performed by software (86), processor(s) (50) execute processor (50)-executable instructions stored in a positioning module (884).

Referring to FIG. 9, in an embodiment of system (1) where robotic arm(s) (34) is/are mounted to mobile device(s) (30), method (1000) includes navigating (1502), by the processor(s) (50), mobile device(s) (30) about retail store environment (2). In an example, processor(s) (50) utilize data acquired from sensor(s) (38) to facilitate navigating mobile device(s) (30), and data representative of spatial characteristics of environment (2) are stored by processor(s) (50) in the database (72) and/or elsewhere in memory device(s) (54). In an example, mobile device control (58), classification (66), and/or teaching (70) functionality of processor(s) (50) facilitates navigating (1502) mobile device(s) (30) about retail store environment (2), including, without limitation, as a part of artificial intelligence and/or machine learning scheme(s). In embodiments for which the navigating (1502) step is implemented and/or otherwise performed by software (86), processor(s) (50) execute processor (50)-executable instructions stored in a navigating module (886).

In the embodiment, method (1000) includes retrieving (1506) the plurality of different items (18, 20, 22) from delivery location (40). In an example, processor(s) (50) utilize robotic arm(s) (34) to facilitate retrieving items (18, 20, 22) from delivery location (40). In an example, mobile device control (58), robotic arm control (62), classification (66), and/or teaching (70) functionality of processor(s) (50) facilitates retrieving (1506) items (18, 20, 22) from delivery location (40), including, without limitation, as a part of artificial intelligence and/or machine learning scheme(s). In embodiments for which the retrieving (1506) step is implemented and/or otherwise performed by software (86), processor(s) (50) execute processor (50)-executable instructions stored in a retrieving module (888).

In the embodiment, method (1000) includes delivering (1510) the plurality of different items (18, 20, 22) to POS locations (8) for the executing (1014, 1050, and/or 1216) step(s) of method (1000). In an example, processor(s) (50) utilize mobile device(s) (30), hitch(es) (51), trailer(s) (59), and/or robotic arm(s) (34) to facilitate delivering items (18, 20, 22) to POS locations (8). In an example, mobile device control (58), robotic arm control (62), classification (66), and/or teaching (70) functionality of processor(s) (50) facilitates delivering (1510) items (18, 20, 22) to POS locations (8), including, without limitation, as a part of artificial intelligence and/or machine learning scheme(s). In embodiments for which the delivering (1510) step is implemented and/or otherwise performed by software (86), processor(s) (50) execute processor (50)-executable instructions stored in a delivering module (890).

In an example, the navigating (1502) step of method (1000) includes sensing (1512), by sensor(s) (38) in communication with processor(s) (50), obstacles (52) present in retail store environment (2). Obstacle(s) (52) present in retail store environment (2) include user(s) (6) and/or people such as shoppers and store employees, other robotic arm(s) (34) and/or mobile device(s) (30), shelves (14), and the like. Obstacle(s) (52) include obstacles (52) positioned on a floor (56) of aisle(s) (10). In an example, processor(s) (50) utilize data acquired from sensors (38) to facilitate sensing (1512) obstacle(s) (52), and data representative of spatial characteristics of obstacles (52) are stored by processor(s) (50) in the database (72) and/or elsewhere in memory device(s) (54). In an example, mobile device control (58), robotic arm control (62), classification (66), and/or teaching (70) functionality of processor(s) (50) facilitates sensing (1512) obstacle(s) (52), including, without limitation, as a part of artificial intelligence and/or machine learning scheme(s). In embodiments for which the sensing (1512) step is implemented and/or otherwise performed by software (86), processor(s) (50) execute processor (50)-executable instructions stored in a sensing module (892).

In the example, the navigating (1502) step of method (1000) includes avoiding (1516), by the mobile device (30) and/or robotic arm(s) (34) in communication with processor(s) (50), the sensed obstacles (52) present in retail store environment (2). In an example, processor(s) (50) read (e.g., from database (72) and/or elsewhere in memory device(s) (54)) the data acquired from sensors (38) in the sensing (1512) step to facilitate avoiding (1516) obstacle(s) (52). In an example, mobile device control (58), robotic arm control (62), classification (66), and/or teaching (70) functionality of processor(s) (50) facilitates avoiding (1516) obstacle(s) (52), including, without limitation, as a part of artificial intelligence and/or machine learning scheme(s). In embodiments for which the avoiding (1516) step is implemented and/or otherwise performed by software (86), processor(s) (50) execute processor (50)-executable instructions stored in an avoiding module (894).

In an example, the retrieving (1506) step of method (1000) includes sensing (1520), by sensor(s) (38) in communication with processor(s) (50), as-delivered position(s) (46) of the one or more the plurality of different items (18, 20, 22) in the delivery location (40). In an example, processor(s) (50) utilize data acquired from sensors (38) to facilitate sensing (1520) as-delivered position(s) (46), and data representative of spatial characteristics of as-delivered position(s) (46) are stored by processor(s) (50) in the database (72) and/or elsewhere in memory device(s) (54). In an example, mobile device control (58), robotic arm control (62), classification (66), and/or teaching (70) functionality of processor(s) (50) facilitates sensing (1520) as-delivered position(s) (46), including, without limitation, as a part of artificial intelligence and/or machine learning scheme(s). In embodiments for which the sensing (1520) step is implemented and/or otherwise performed by software (86), processor(s) (50) execute processor (50)-executable instructions stored in a sensing module (896).

In the example, the navigating (1502) step of method (1000) includes moving (1524), by robotic arm(s) (34), one or more the plurality of different items (18, 20, 22) from the sensed as-delivered positions (46) to one or more intermediate position(s) (44) for the delivering (1510) step. As shown in FIG. 3, intermediate position(s) (44) include, for example and without limitation, position(s) on trailer(s) (59), position(s) on floor (56), and position(s) on (e.g., being held by) robotic arm(s) (34). In an example, processor(s) (50) read (e.g., from database (72) and/or elsewhere in memory device(s) (54)) the data acquired from sensor(s) (38) in the sensing (1512) step to facilitate moving (1524) item(s) (18, 20, 22) to intermediate position(s) (44). In an example, mobile device control (58), robotic arm control (62), classification (66), and/or teaching (70) functionality of processor(s) (50) facilitates moving (1524) item(s) (18, 20, 22) to intermediate position(s) (44), including, without limitation, as a part of artificial intelligence and/or machine learning scheme(s). In embodiments for which the moving (1524) step is implemented and/or otherwise performed by software (86), processor(s) (50) execute processor (50)-executable instructions stored in an moving module (898).

Embodiments of the above-described robotic manipulation intelligence systems and methods for automatic restocking of items in retail store environments provide users a number of beneficial technical effects and realize various advantages as compared to known robotic restocking systems and methods. Such benefits include, without limitation, being more efficient in use of computing resources, network bandwidth, and memory storage capacity, providing less expensive and more user friendly installation, operation, and maintenance, consuming less power, being safer and less intrusive to users, shoppers, and employees in retail store and other use environments, allowing use with a number of different items, packaging configurations, delivery modalities, and POS configurations, being interoperable with various extant store equipment, and having the ability to utilize a number of data communication protocols.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

We claim:

1. A method for automatic restocking a plurality of different items in a retail store environment having point of sale (POS) locations for the plurality of different items including at least one shelf positioned adjacent to at least one aisle, the method comprising:
for a first item of the plurality of different items:
storing in a database at least one first item parameter uniquely identifying the first item;
determining, by a processor in communication with the database and based on the at least one first item parameter, a first autonomous movement control scheme for manipulation of the first item by a robotic arm in communication with the processor;
executing, by the robotic arm, the first autonomous movement control scheme, wherein the executing includes shelving the first item on the at least one shelf;
evaluating, by at least one of: the processor, and a user of the robotic arm, the executing for the first item according to at least one predetermined first performance criteria stored in the database, the at least one predetermined first performance criteria comprising a position of the first item on the at least one shelf; and
determining and storing in the database, by the processor and based on a result of the evaluating, an updated first autonomous movement control scheme for subsequent executing by the robotic arm for the first item, wherein the subsequent executing includes shelving the first item on the at least one shelf,
wherein the at least one first item parameter uniquely identifies at least one physical attribute of the first item, the at least one physical attribute comprising a shape, a weight, a height, and/or a length of the first item.

2. The method of claim 1, further comprising:
for a second item of the plurality of different items:
storing in the database at least one second item parameter uniquely identifying the second item from at least the first item;
determining, by the processor and based on the at least one second item parameter, a second autonomous movement control scheme for manipulation of the second item by the robotic arm;
executing, by the robotic arm, the second autonomous movement control scheme, wherein the executing includes shelving the second item on the at least one shelf;
evaluating, by at least one of: the processor, and the user, the executing for the second item according to at least one predetermined second performance criteria stored in the database; and
determining and storing, by the processor and based on a result of the evaluating, an updated second autonomous movement control scheme for subsequent executing by the robotic arm.

3. The method of claim 2, wherein the at least one second item parameter uniquely identifies at least one physical attribute of the second item.

4. The method of claim 2, further comprising:
for a third item of the plurality of different items and in the absence of at least one third item parameter uniquely identifying the third item from at least one of: the at least the first item, and at least the second item, being stored in the database:
sensing, by at least one sensor in communication with the processor, the at least one third item parameter;
storing, by the processor, the at least one third item parameter in the database;
determining, by the processor and based on the at least one third item parameter, a third autonomous movement control scheme for manipulation of the third item by the robotic arm;
executing, by the robotic arm, the third autonomous movement control scheme, wherein the executing includes shelving the third item on the at least one shelf;
evaluating, by at least one of: the processor, and the user, the executing for the third item according to at least one predetermined third performance criteria stored in the database; and
determining and storing in the database, by the processor and based on the evaluating, an updated third autonomous movement control scheme for subsequent executing by the robotic arm.

5. The method of claim 1, wherein the shelving includes:
sensing, by at least one sensor in communication with the processor, one or more available positions on the at least one shelf; and
positioning, by the robotic arm, the first item on the at least one shelf based on the sensed one or more available positions.

6. The method of claim 1, wherein the retail store environment includes a delivery location, wherein the robotic arm is mounted to a mobile device, and wherein the method further includes:
navigating the mobile device about the retail store environment;
retrieving the plurality of different items from the delivery location; and
delivering the plurality of different items to the POS locations for the executing.

7. The method of claim 6, wherein the navigating includes:
sensing, by at least one sensor in communication with the processor, obstacles present in the retail store environment;
avoiding, by the mobile device, the sensed obstacles,
wherein the obstacles include obstacles positioned on a floor of the at least one aisle.

8. The method of claim 6, wherein the retrieving includes:
sensing, by at least one sensor in communication with the processor, one or more as-delivered positions of the first item in the delivery location; and
moving, by the robotic arm, the first item from the sensed one or more as-delivered positions to an intermediate position for the delivering.

9. A system for automatic restocking a plurality of different items in a retail store environment having point of sale (POS) locations for the plurality of different items including at least one shelf positioned adjacent to at least one aisle, the system comprising:

at least one robotic arm;
one or more processors in communication with the at least one robotic arm;
one or more memory devices in communication with the one or more processors, wherein the one or more memory devices include a database stored therein, and wherein the one or more processors are programmed to, for a first item of the plurality of different items:
store at least one first item parameter uniquely identifying the first item in the database;
determine, based on the at least one first item parameter, a first autonomous movement control scheme for manipulation of the first item by the at least one robotic arm;
execute, by the at least one robotic arm, the first autonomous movement control scheme, wherein, for executing the first autonomous movement control scheme, the one or more processors are further programmed to shelve the first item on the at least one shelf;
evaluate the execution of the first autonomous movement control scheme for the first item according to at least one predetermined first performance criteria stored in the database, the at least one predetermined first performance criteria comprising a position of the first item on the at least one shelf; and
determine and store in the database, based on a result of the evaluation of the execution of the first autonomous movement control scheme, an updated first autonomous movement control scheme for at least one subsequent execution by the at least one robotic arm for the first item, wherein, for the at least one subsequent execution of the updated first autonomous movement control scheme, the one or more processors are further programmed to shelve the first item on the at least one shelf,
wherein the at least one first item parameter uniquely identifies at least one physical attribute of the first item, the at least one physical attribute comprising a shape, a weight, a height, and/or a length of the first item.

10. The system of claim 9, wherein the one or more processors are further programmed to, for a second item of the plurality of different items:
store at least one second item parameter uniquely identifying the second item from at least the first item in the database;
determine, based on the at least one second item parameter, a second autonomous movement control scheme for manipulation of the second item by the at least one robotic arm;
execute, by the at least one robotic arm, the second autonomous movement control scheme, wherein, for executing the second autonomous movement control scheme, the one or more processors are further programmed to shelve the second item on the at least one shelf;
evaluate the execution of the second autonomous movement control scheme for the second item according to at least one predetermined second performance criteria stored in the database; and
determine and store in the database, based on a result of the evaluation of the execution of the second autonomous movement control scheme, an updated second autonomous movement control scheme for at least one subsequent execution by the at least one robotic arm for the second item.

11. The system of claim 10, wherein the at least one second item parameter uniquely identifies at least one physical attribute of the second item.

12. The system of claim 10, further comprising at least one sensor in communication with the one or more processors, wherein the one or more processors are further programmed to,
for a third item of the plurality of different items and in the absence of at least one third item parameter uniquely identifying the third item from at least one of: the at least the first item, and at least the second item, being stored in the database:
sense, by the at least one sensor, the at least one third item parameter;
store the at least one third item parameter in the database;
determine, based on the at least one third item parameter, a third autonomous movement control scheme for manipulation of the third item by the at least one robotic arm;
execute, by the at least one robotic arm, the third autonomous movement control scheme, wherein, for executing the third autonomous movement control scheme, the one or more processors are further programmed to shelve the third item on the at least one shelf;
evaluate the execution of the third autonomous movement control scheme according to at least one predetermined third performance criteria stored in the database; and
determine and store in the database, based on a result of the evaluation of the execution of the third autonomous movement control scheme, an updated third autonomous movement control scheme for at least one subsequent execution by the at least one robotic arm for the third item.

13. The system of claim 9, further comprising at least one sensor in communication with the one or more processors, wherein, for shelving the first item on the at least one shelf, and wherein the one or more processors are further programmed to:
sense, by the at least one sensor, one or more available positions on the at least one shelf; and
position, by the at least one robotic arm, the first item on the at least one shelf based on the sensed one or more available positions.

14. The system of claim 9, wherein the retail store environment includes a delivery location, wherein the system further comprises at least one mobile device, wherein the at least one robotic arm is mounted to the at least one mobile device, and wherein the one or more processors are further programmed to:
navigate the mobile device about the retail store environment;
retrieve the plurality of different items from the delivery location; and
deliver the plurality of different items to the POS locations for executing the first autonomous movement control scheme by the at least one robotic arm.

15. The system of claim 14, further comprising at least one sensor in communication with the one or more processors, wherein, for navigating the mobile device in the retail store environment, the one or more processors are further programmed to:
sense, by the at least one sensor, obstacles present in the retail store environment; and
avoid, by the mobile device, the sensed obstacles, wherein the obstacles include obstacles positioned on a floor of the at least one aisle.

16. The system of claim 14, further comprising at least one sensor in communication with the one or more processors, wherein, for retrieving the plurality of different items from the delivery location, the one or more processors are further programmed to:
  sense, by the at least one sensor, one or more as-delivered positions of the first item in the delivery location; and
  move, by the robotic arm, the first item from the sensed one or more as-delivered positions to an intermediate position for delivering the first item to the POS locations.

17. A non-transient computer-readable medium storing as software processor-executable instructions for automatically restocking a plurality of different items in a retail store environment having point of sale (POS) locations for the plurality of different items including at least one shelf positioned adjacent to at least one aisle, wherein, when executed by one or more processors in communication with a database, the processor-executable instructions cause the one or more processors to,
  for a first item of the plurality of different items:
    obtain and store at least one first item parameter uniquely identifying the first item in the database;
    determine, based on the at least one first item parameter, a first autonomous movement control scheme for manipulation of the first item by a robotic arm in communication with the one or more processors;
    execute, by the robotic arm, the first autonomous movement control scheme, wherein, for executing the first autonomous movement control scheme, the processor-executable instructions further cause the one or more processors to shelve the first item on the at least one shelf;
    evaluate the execution of the first autonomous movement control scheme for the first item according to at least one predetermined first performance criteria stored in the database, the at least one predetermined first performance criteria comprising a position of the first item on the at least one shelf; and
    determine and store in the database, based on a result of the evaluation of the execution of the first autonomous movement control scheme, an updated first autonomous movement control scheme for at least one subsequent execution by the robotic arm for the first item, wherein, for the at least one subsequent execution of the updated first autonomous movement control scheme, the processor-executable instructions further cause the one or more processors to shelve the first item on the at least one shelf,
  wherein the at least one first item parameter uniquely identifies at least one physical attribute of the first item, the at least one physical attribute comprising a shape, a weight, a height, and/or a length of the first item.

18. The non-transient computer-readable medium of claim 17, wherein, when executed by the one or more processors, the processor-executable instructions further cause the one or more processors to,
  for a second item of the plurality of different items:
    obtain and store at least one second item parameter uniquely identifying the second item from at least the first item in the database;
    determine, based on the at least one second item parameter, a second autonomous movement control scheme for manipulation of the second item by the robotic arm;
    execute, by the robotic arm, the second autonomous movement control scheme, wherein, for executing the second autonomous movement control scheme, the processor-executable instructions further cause the one or more processors to shelve the second item on the at least one shelf;
    evaluate the execution of the second autonomous movement control scheme for the second item according to at least one predetermined second performance criteria stored in the database; and
    determine and store in the database, based on a result of the evaluation of the execution of the second autonomous movement control scheme, an updated second autonomous movement control scheme for at least one subsequent execution by the robotic arm for the second item.

* * * * *